US006253143B1

(12) United States Patent
Silvernagle et al.

(10) Patent No.: US 6,253,143 B1
(45) Date of Patent: Jun. 26, 2001

(54) SAFETY LIMITER FOR POWERED VEHICLES

(75) Inventors: Darin Silvernagle, Airdrie; Don Lafont, Calgary, both of (CA)

(73) Assignee: Veritas DGC, Inc., Houston, TX (US)

(*) Notice: Subject to any disclaimer, the term of this patent is extended or adjusted under 35 U.S.C. 154(b) by 0 days.

(21) Appl. No.: 09/237,319

(22) Filed: Jan. 26, 1999

(51) Int. Cl.[7] ................................ B60T 8/32; G06F 7/00

(52) U.S. Cl. ............................ 701/93; 701/104; 123/335; 123/339.14; 123/406.24; 123/406.64

(58) Field of Search ............................ 701/93, 102, 110, 701/104; 180/173; 340/438, 439, 430, 441; 123/406.16, 406.65, 609, 333, 335, 339.24, 339.25, 361, 406.35, 406.37, 406.57, 373, 357, 449, 320, 319, 339.14, 351, 406.23, 406.64

(56) References Cited

U.S. PATENT DOCUMENTS 4,101,869 7/1978 Henderson .......................... 340/439
4,181,103 1/1980 Sturdy ................................. 123/320
4,244,336 * 1/1981 Fitzner ........................... 123/406.57
4,252,096 2/1981 Kennedy ............................. 123/370
4,495,918 * 1/1985 Sugiura et al. ................. 123/406.16
4,630,043 * 12/1986 Haubner et al. ................ 340/825.57
4,709,335 11/1987 Okamoto ............................. 701/104
4,713,763 12/1987 Hofmann ............................ 701/103
4,787,053 11/1988 Moore ................................. 701/123
4,791,901 12/1988 Eheim ................................. 123/373
4,887,215 * 12/1989 Kumagai et al. .................... 701/102
5,033,431 * 7/1991 Poirier et al. ................... 123/339.24
5,113,821 * 5/1992 Fukui et al. ......................... 123/333
5,190,487 3/1993 Fukui ...................................... 440/1
5,213,080 * 5/1993 Lambert et al. ................ 123/406.65
5,219,033 6/1993 Pollner et al. ...................... 180/14.6
5,287,837 2/1994 Hashimoto et al. ............ 123/406.29
5,581,464 12/1996 Woll et al. ............................ 701/35
5,706,199 * 1/1998 Wilson et al. ......................... 701/93
5,742,914 4/1998 Hagenbuch ............................ 701/35
5,759,133 * 6/1998 Treinies et al. ...................... 477/110
5,775,290 7/1998 Staerzl et al. ........................ 123/335

* cited by examiner

*Primary Examiner*—Jacques H. Louis-Jacques
(74) *Attorney, Agent, or Firm*—Conley, Rose & Tayon, P.C.

(57) ABSTRACT

A vehicle control unit is disclosed which can be coupled between a tachometer sensor and an electronic ignition system on a vehicle. The unit is also coupled to a speedometer sensor to measure the vehicle's speed. The vehicle control unit limits the vehicle speed by modifying the tachometer signal from the tachometer sensor and providing the modified tachometer signal to the ignition system. The tachometer signal is a pulse train which is used by the electronic ignition system to determine ignition timing. The vehicle control unit limits both ground speed and engine speed by suppressing pulses from the original tachometer signal to prevent the combustion of fuel and thereby reduce engine power when the ground or engine speeds exceed predetermined limits. The vehicle control unit is microcontroller-based and preferably includes a logging function and an acceleration sensor. The microcontroller is coupled to the acceleration sensor to detect the peak accelerations experienced by the vehicle. The microcontroller stores peak accelerations above a predetermined limit, along with excessive ground and engine speeds, as part of a fault record a nonvolatile memory. The records can be examined by management personnel to identify reckless vehicle operators. Corrective action can then be taken to protect personnel and equipment. A handheld programming unit is also disclosed herein for programming the predetermined limits and for retrieving fault records. The programming unit can display and summarize fault records, and can be used to transport the fault information to a central computer system for archiving and more extensive analysis.

12 Claims, 5 Drawing Sheets

122
ACCELEROMETER
149
SAMPLE & HOLD LOGIC
150
NONVOLATILE MEMORY
154
MICRO-CONTROLLER
148
INFRARED PORT LOGIC
156
157
POWER SUPPLY
144
SIGNAL CONDITIONERS
146
OUTPUT SIGNAL LOGIC
152
POWER VOLTAGE
SPEEDOMETER SIGNAL
TACHOMETER SIGNAL
NEW TACH SIGNAL
DEVICE CONNECTOR
142

126
COMPUTER PORT
180
MATRIX KEYPAD
174
INFRARED PORT LOGIC
176
MICRO-CONTROLLER
170
NONVOLATILE MEMORY
172
POWER SUPPLY
168
DISPLAY MODULE
178

SAFETY LIMITER FOR POWERED VEHICLES

BACKGROUND OF THE INVENTION

1. Field of the Invention

The present invention generally relates to systems and methods for enhancing driver safety. More particularly, this invention relates to an engine limiter which regulates the engine speed and ground speed of a powered vehicle, particularly an off-road vehicle. Still more particularly, the invention relates to a programmable electronic module which may be easily added to vehicles having electronic ignition systems to prevent dangerous or reckless operation of the vehicle.

2. Background of the Invention

Entities which conduct business in wilderness areas often find off-road vehicles to be invaluable tools. Single-person all-terrain vehicles (ATVs) such as three-wheelers (trikes) and four-wheelers (quads) are extensively used by survey parties, for example, operating in otherwise inaccessible areas. However other vehicles, such as snowmobiles, waterbikes, motorcycles, and golf carts, also have characteristics that lend themselves to specialized uses by these entities.

Although indispensable, use of these vehicles poses certain problems for these entities. These vehicles may be dangerous to operators who operate them at excessive speeds. Accidents that occur are nearly always the result of driving too fast. The terrain tends to be unpredictable, so that lower speeds are needed for safe operation. Nevertheless, repeated warnings to vehicle operators may have little effect in ensuring safe operation.

Reducing the accident rate will lead to reductions in injuries, equipment damage, insurance, and repair costs. Accordingly, it is desirable to provide an easily installed system for preventing reckless operation of powered vehicles.

BRIEF SUMMARY OF THE INVENTION

The present invention contemplates a vehicle control unit which can be coupled between a tachometer sensor and an electronic ignition system on a powered vehicle. The unit is preferably also coupled to a speedometer sensor to receive a signal indicative of the vehicle's speed. The vehicle control unit limits speed by modifying a tachometer signal generated by a tachometer sensor and providing the modified tachometer signal to the ignition system. The original tachometer signal is a pulse train which, in conventional vehicles, is used by the electronic ignition system to determine ignition timing. Preferably, the vehicle control unit limits both ground speed and engine speed by suppressing or "removing" pulses from the original tachometer signal to prevent the combustion of fuel and thereby reduce engine power when the ground or engine speeds exceed predetermined limits.

In one embodiment, the vehicle control unit includes a microcontroller and an output signal module. The microcontroller receives the speedometer and tachometer signals, and responsively provides a suppression signal to the output signal module. The output signal module receives the tachometer signal and the suppression signal, and produces a modified tachometer signal by passing pulses from the tachometer signal when the suppression signal is de-asserted, and by suppressing pulses from the tachometer signal when the suppression signal is asserted. The microcontroller is configured to assert the suppression signal for a selected number of consecutive pulses upon determining that the ground speed has exceeded the predetermined limit. The selected number of consecutive pulses may depend on the margin by which the predetermined limit has been exceeded.

In a preferred embodiment, the vehicle control unit also includes a logging function and an acceleration, or "shock", sensor. The microcontroller is coupled to the acceleration sensor to detect the peak accelerations experienced by the vehicle. The microcontroller stores peak accelerations above a predetermined limit, along with excessive ground and engine speeds, as part of a fault record in a nonvolatile memory. The records can be downloaded and examined by management personnel to identify reckless vehicle operators. Corrective action can then be taken to protect personnel and equipment.

A handheld programming unit is also disclosed herein for programming the predetermined limits and for retrieving fault records. The programming unit can display and summarize fault records, and can be used to transport the fault information to a central computer system for archiving and more extensive analysis should that be desired.

The various characteristics described above, as well as other features, will be readily apparent to those skilled in the art upon reading the following disclosure.

BRIEF DESCRIPTION OF THE DRAWINGS

A complete understanding of the present invention can be obtained when the following detailed description of the preferred embodiments is considered in conjunction with the following drawings, in which.

NOMENCLATURE

Certain terms are used throughout the following description and claims to refer to particular system components. As one skilled in the art will appreciate, components may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF PREFERRED EMBODIMENTS

Figure 1:
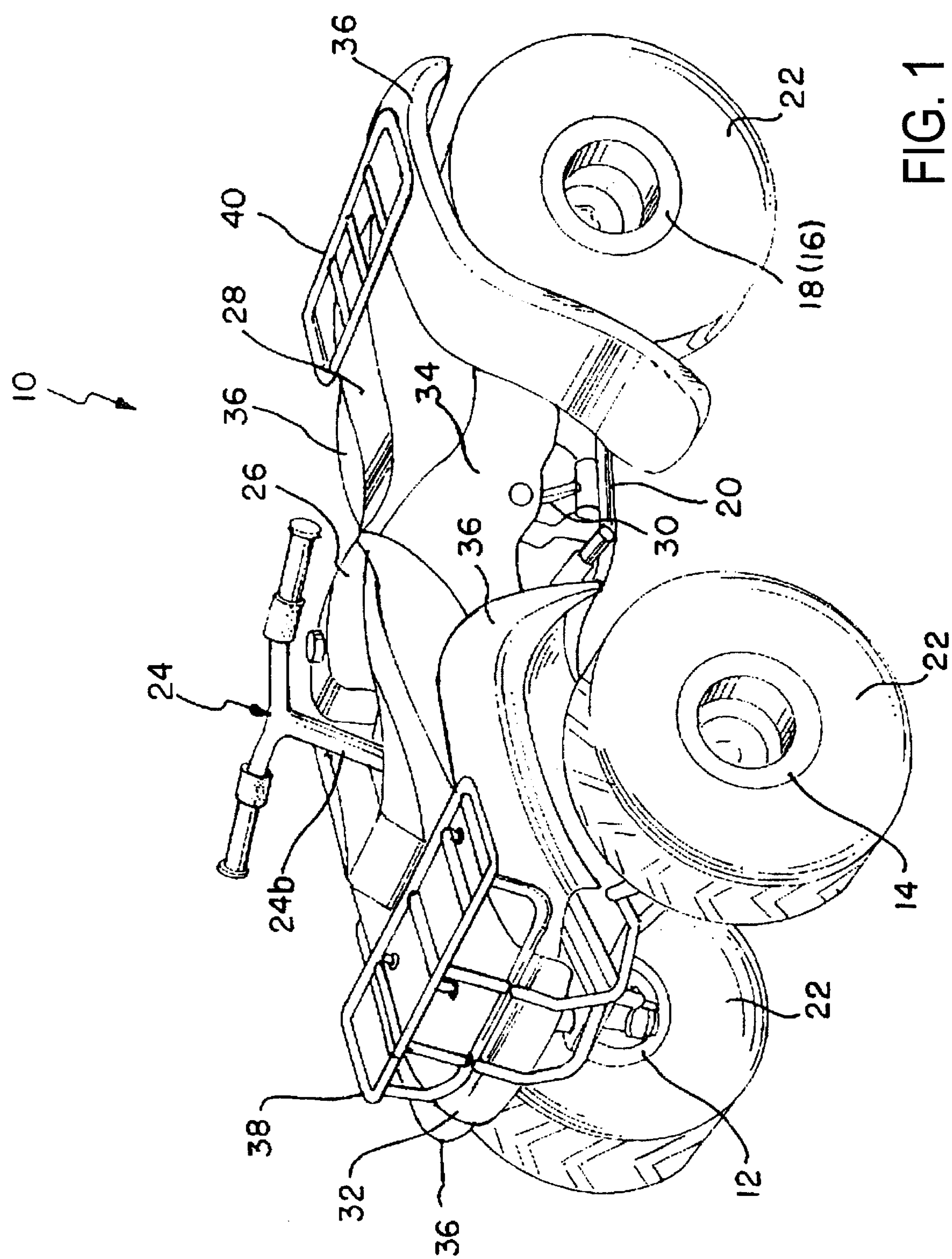
FIG. 1 shows an all-terrain vehicle which is one contemplated environment for the present invention.

Referring now to FIG. 1, a saddle-seat all-terrain vehicle 10 is shown. This vehicle 10 includes a pair of right and left front wheels 12, 14, and a pair of right and left rear wheels 16, 18, which are respectively suspended from front and rear portions of a vehicle framework 20. A balloon-type low pressure tire 22 is mounted around each of the front wheels 12, 14 and the rear wheels 16, 18. A steering handle 24, a fuel tank 26, and a saddle seat 28 are disposed on the upper portion of the vehicle frame 20. An engine 30 for driving the rear wheels 16, 18 is disposed within the vehicle frame 20. In some configurations, the engine 30 also drives front wheels 12, 14.

A front body cover 32 and a rear body cover 34 are arranged over the upper portions of vehicle frame 20. The front body cover 32 and rear body cover 34 each include fenders 36 for covering upper portions of front and rear tires 22. Front and rear cargo carriers 38, 40 are arranged over the front and rear body covers 32, 34 for allowing cargo to be secured thereto. It should be appreciated that the foregoing features of the vehicle, such as the positioning and type of body cover, the use of cargo carriers, etc. may readily be varied. This description of the vehicle is given to provide an illustrative environment in which the safety limiter may be used, and is not intended to limit the instant invention. Moreover, it is recognized that the principles described herein not only apply to all-terrain vehicles, but also apply to other powered vehicles such as motorcycles, snowmobiles, three-wheeled vehicles, and more.

Figure 2:
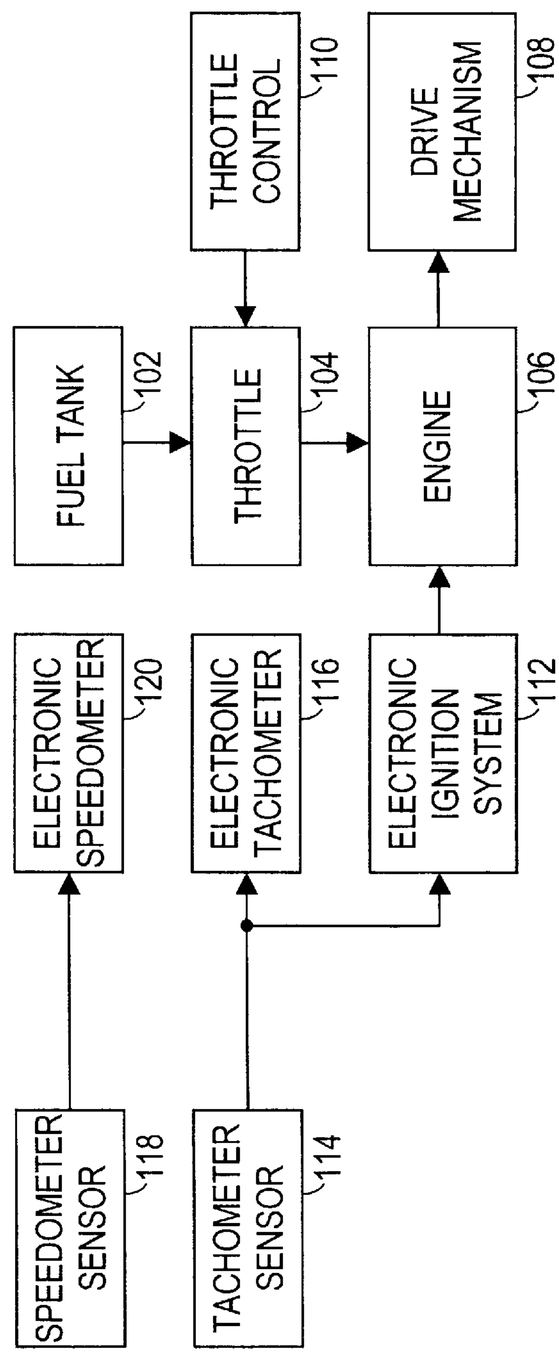
FIG. 2 shows a block diagram of a typical engine configuration known in the art.

Referring now to FIG. 2, a representative prior art engine configuration is shown. A fuel tank 102 is coupled to provide fuel to an engine 106 via a throttle 104. The engine 106 converts the fuel into power to drive the vehicle drive mechanism 108. The amount of power provided to the drive mechanism 108 may be governed by a vehicle operator using throttle control 110. The engine configuration of FIG. 2 includes an electronic ignition system 112 which provides an ignition signal to engine 106. The conversion of fuel into drive power by engine 106 depends upon timed ignition pulses from the electronic ignition system 112. To provide these ignition pulses, the electronic ignition system 112 relies on a signal from a tachometer sensor 114 which provides a signal indicative of the engine speed. In preferred embodiments, the tachometer sensor 114 is a Hall effect sensor located near the crankshaft, the magneto, or the camshaft in engine 106, and the tachometer signal is an electronic "pulse train" (i.e. a repetitive series of voltage pulses) which is indicative of the position of the corresponding engine element. The tachometer signal 114 may also be provided to an electronic tachometer 116 for display of an engine speed to the vehicle operator. Preferably a speedometer sensor 118 is included to provide an electronic pulse train to an electronic speedometer 120 for display of a vehicle speed to the vehicle operator. In the preferred embodiments, the speedometer sensor is a Hall effect sensor located near a driveshaft, an axle, or wheel in drive mechanism 108, and the speedometer signal is indicative of the vehicle's ground speed.

This representative engine configuration is provided for explanatory purposes, and is not intended to limit the instant invention. One of skill in the art would readily recognize the applicability of the instant invention to various other engine configurations, including electric engines and engines where means other than control of a throttle are used by the operator to govern the amount of power provided by engine 106.

Figure 3:
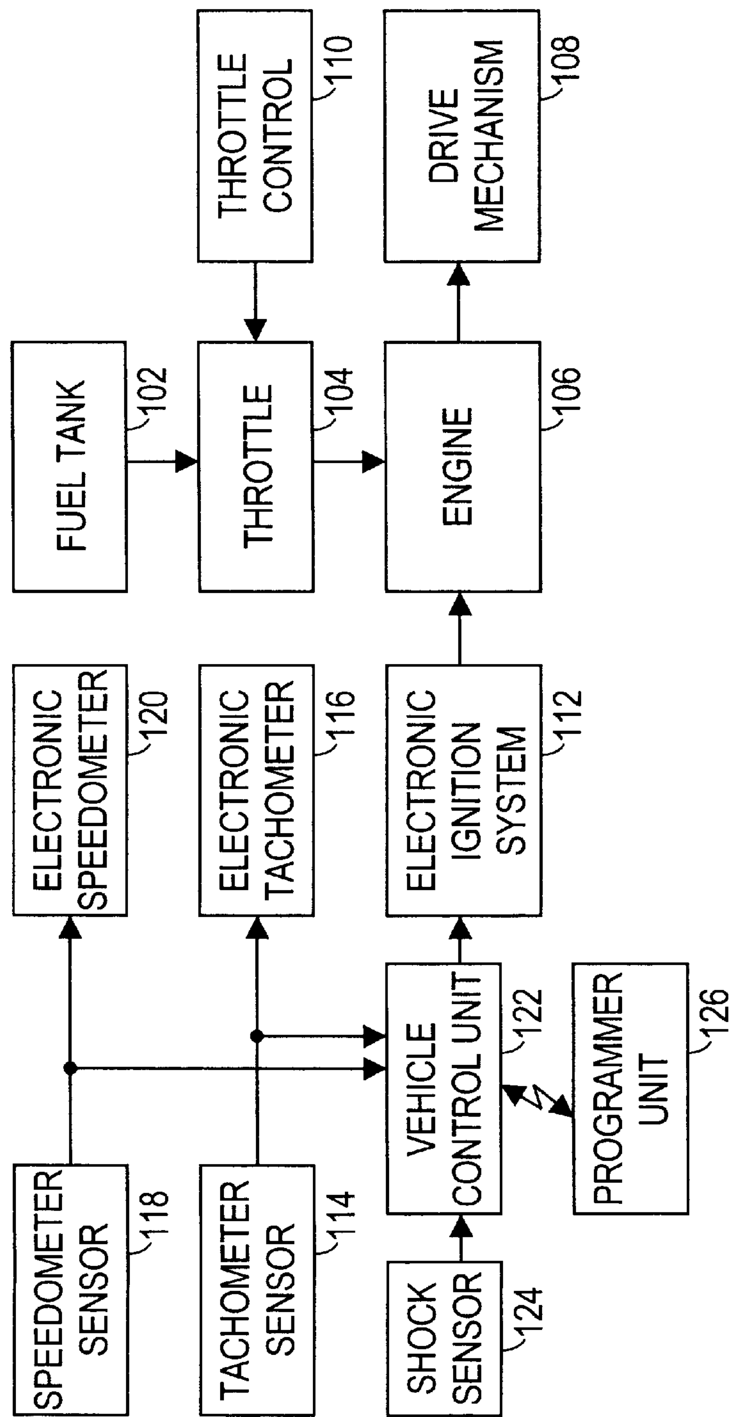
FIG. 3 shows a block diagram an engine configuration of the present invention including a vehicle control unit.

Referring now to FIG. 3, the representative engine configuration of FIG. 2 is shown having an added vehicle control unit 122. The vehicle control unit 122 receives the speedometer and tachometer signals from the speedometer sensor 118 and the tachometer sensor 114. The vehicle control unit 122 conditions or modifies the tachometer signal and provides the modified tachometer signal to the electronic ignition system 112. A shock sensor 124 may additionally be included to provide an electronic signal to the vehicle control unit 122 indicative of the acceleration forces experienced by the vehicle 10. The shock sensor 124 may illustratively be an accelerometer or strain gauge. Preferably, the shock sensor 124 is closely mechanically coupled to the vehicle frame 20 or other suitable surface of the vehicle 10. FIG. 3 also shows a handheld programmer unit 126. The programmer unit 126 may be used for programming the various operation parameters of vehicle control unit 122, and also may be used to retrieve log data from the vehicle control unit 122. As discussed further below, the log data may be used to evaluate the performance of a vehicle operator.

In a preferred embodiment, the vehicle control unit 122 is a compact electronic module which includes an integrated shock sensor 124. The vehicle control unit 122 is preferably configured to be easily mounted in an accessible spot on vehicle frame 20, and is preferably provided with a simple connector for easy coupling and decoupling with the vehicle's factory-installed electrical system. The modifications to the original electrical system to accommodate the vehicle control unit 122 are advantageously minor and easily reversible.

Figure 4:
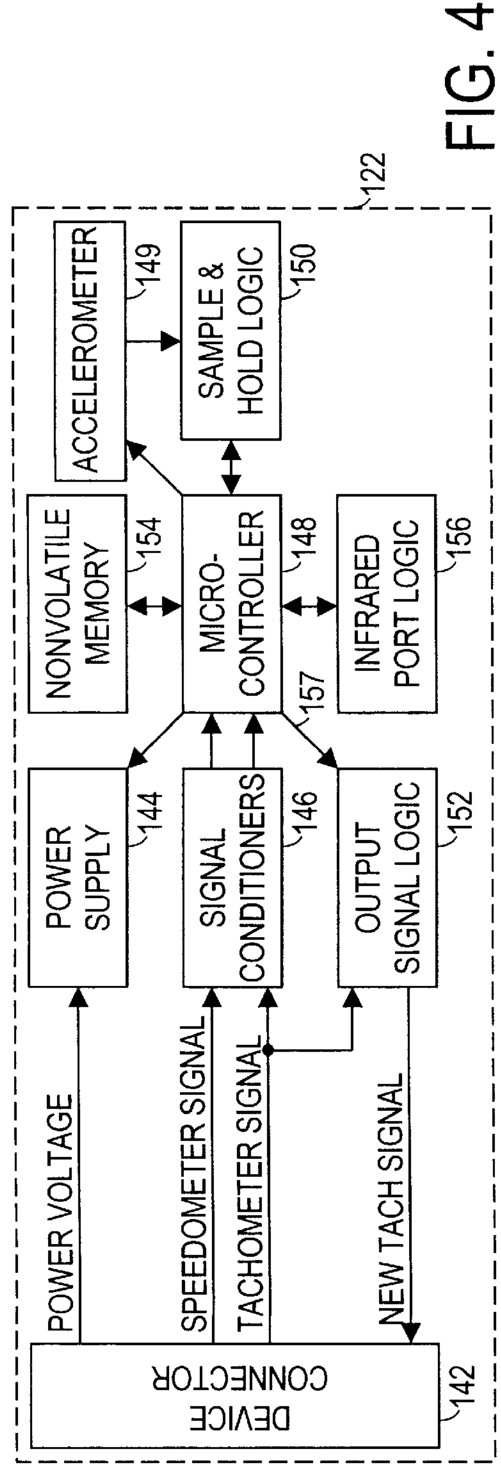
FIG. 4 shows a block diagram of one embodiment of the vehicle control unit of FIG. 3 including a microcontroller.

Referring now to FIG. 4, a block diagram is shown of one embodiment of vehicle control unit 122. An electrical connector 142 supplies power voltages (such as ground and 12 volts) to power supply 144. Power supply 144 provides power conversion and voltage regulation as needed, and supplies power to the rest of the components in control unit 122. Power supply 144 is preferably capable of being placed in a power-down or "sleep" mode by microcontroller 148. In sleep mode, power to various components is removed to reduce power consumption, thereby reducing the drain on the vehicle's battery (not shown).

Electrical connector 142 also provides the speedometer and tachometer signals to signal conditioners 146. Signal conditioners 146 provide protection against signal transients, and "clean up" the incoming signals to better approximate digital pulse waveforms. Accordingly, signal conditioners 146 preferably include lowpass filters and saturating amplifiers.

Microcontroller 148, which may be selected from the MSP430 microcontroller family manufactured by Texas Instruments, processes the signals from signal conditioners 146, and additionally processes signals received from accelerometer 149 via sample and hold logic 150. Accelerometer 149 provides a signal indicative of the magnitude of the acceleration applied to the vehicle frame 20 (FIG. 1). Preferably, accelerometer 149 is sensitive to acceleration along both the longitudinal and vertical axes of vehicle 10. Microcontroller 148 may be programmed to adjust the accelerometer's sensitivity. Sample and hold logic 150 operates to "freeze" the accelerometer output signal while the microcontroller 148 measures the signal amplitude. In one implementation, the sample and hold logic 150 is configured to detect the peak acceleration between sampling intervals.

Microcontroller 148 processes the speedometer, tachometer, and accelerometer signals, and responsively determines whether or not to suppress the ignition pulse based on predetermined and programmed criteria. Output signal logic 152 normally passes the tachometer signal back to connector 142 as the new tachometer signal, so that pulses from the tachometer sensor are passed on to the electronic ignition system 112 (FIG. 3). However, when microcontroller 148 asserts a suppress signal 157, the output signal logic 152 blocks pulses from the tachometer sensor 114, so that there is a pulse missing from the new tachometer signal. This "fools" the electronic ignition system 112 into not firing, thereby reducing the power produced by engine 106. Depending on the engine configuration, it may be necessary to block tachometer pulses in pairs, triplets, or other integer multiples to avoid damaging engine 106. Longer suppression periods may be used by microcontroller 148 to suppress consecutive ignition pulses to further reduce engine power.

In a preferred embodiment, the microcontroller 148 asserts the suppression signal after one of the pre-programmed limits has been exceeded. The excursions beyond the pre-programmed limits by more than a reasonable amount are directly attributable to irresponsible behavior by the vehicle operator, and it is expected that a correlation exists between the number of faults (excessive excursions beyond the limits) and the recklessness of the vehicle operator. Accordingly, microcontroller 148 is preferably configured to keep a fault log.

Microcontroller 148 is coupled to a nonvolatile memory 154 to log events and to store programmable parameters. Memory 154 may additionally store program code for execution by microcontroller 148. The microcontroller 148 is also coupled to infrared port logic 156 for communication with the programmer unit 126. Infrared port logic 156 supports bi-directional communication so that commands and parameter settings can be received from programmer unit 126, and status information and log data can be sent to programmer unit 126.

Figure 5:
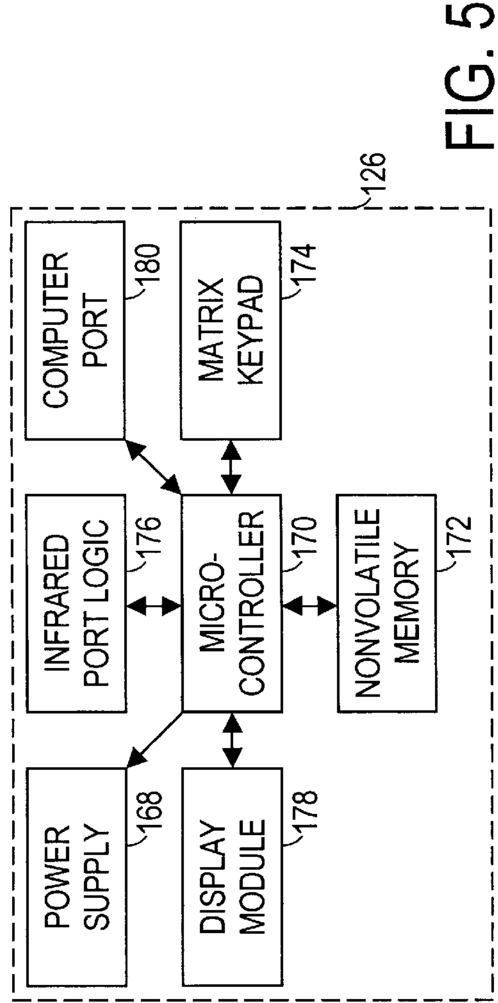
FIG. 5 shows a block diagram of one embodiment of a handheld programmer unit which may be employed with the vehicle control unit of FIG. 3.

FIG. 5 shows a block diagram of one embodiment of programmer unit 126. Programmer unit 126 includes a power supply 168, a microcontroller 170, a nonvolatile memory 172, a matrix keypad 174, infrared port logic 176, a display module 178, and a computer port 180. Power supply 168 preferably includes a battery or other power source and to provide power to the other components of programmer unit 126. Power supply 168 is configured to place the programmer unit 126 in a power-down or sleep mode upon receiving a signal from microcontroller 170.

Microcontroller 170 is configured to execute software stored in nonvolatile memory 172 in response to input from the operator of programmer unit 126. The operator enters input via a the matrix keypad 174. The input can include commands and parameter settings for the vehicle control unit 122. Microcontroller 170 communicates the commands and parameter settings to the vehicle control unit 122 via infrared port logic 176. The infrared port logic 176 communicates with infrared port logic 156 of vehicle control unit 122. Microcontroller 170 can further retrieve status and log information from vehicle control unit via the infrared port logic 176. The microcontroller is configured to summarize and display the information to the operator via the display module 178. The display module 178 is preferably an alphanumeric liquid crystal display or other suitable display screen. The microcontroller 170 can also download the status and log information to an external computer via computer port 180.

Programmer unit 126 is preferably a convenient handheld unit for retrieving information from vehicle control units and summarizing the information for an operator, and for programming operational parameters of the vehicle control units. It can also be used to transport information to a central location for analysis and long term storage.

The operational parameters preferably include limits on engine speed, ground speed, and acceleration. In one exemplary embodiment, the engine speed limit can be set in increments of 500 revolutions per minute (RPM), the ground speed limit can be set in increments of 5 miles per hour (MPH), and the acceleration limit can be set in increments of ⅕ earth's gravity (g), or about 2 $m/s^2$.

Figure 6:
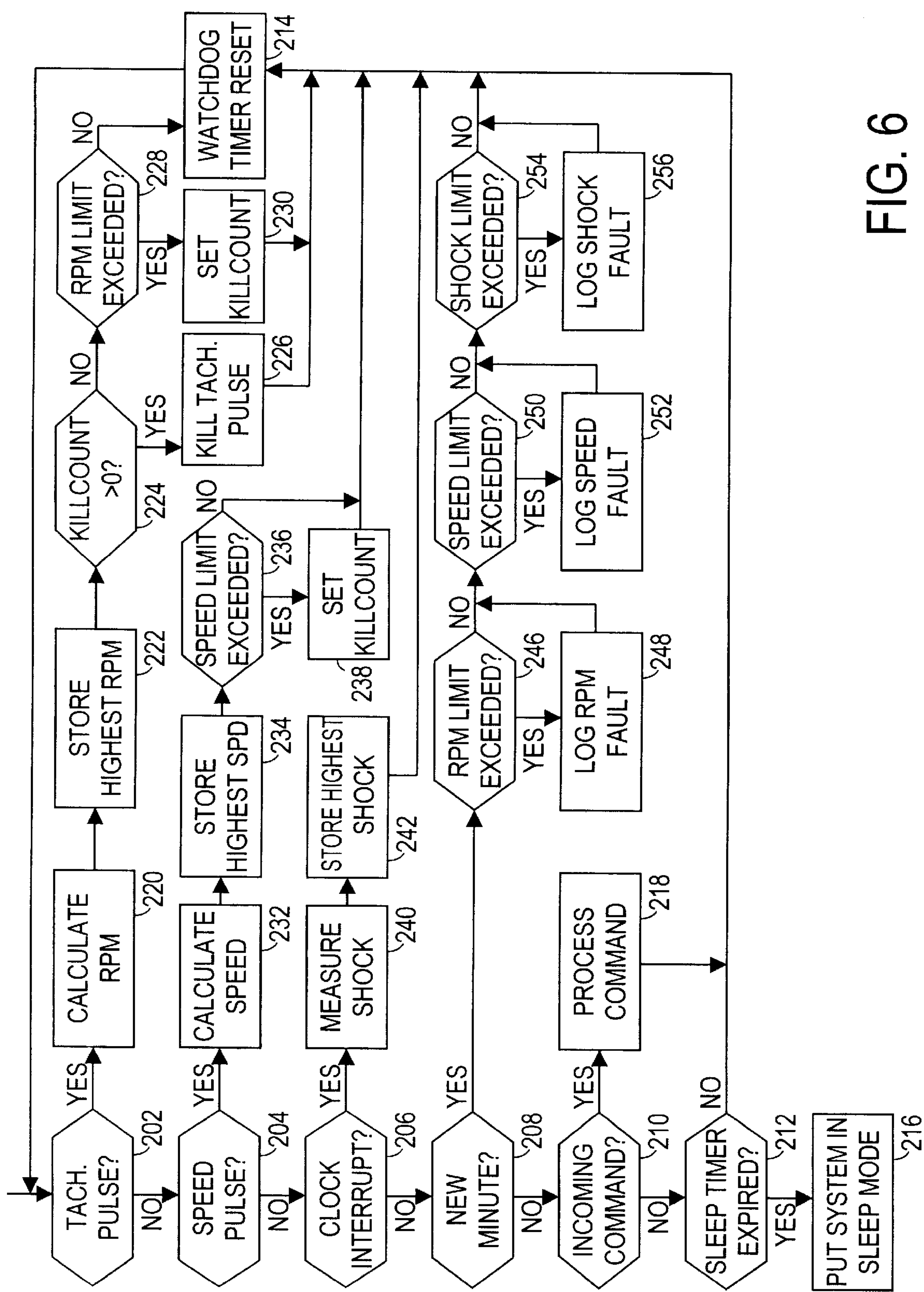
FIG. 6 shows a flow diagram of one embodiment of the method implemented by the microcontroller of FIG. 4.

Referring now to FIG. 6, a exemplary flowchart of the operation of the vehicle control unit's microcontroller 148 is shown. An outer software loop is formed by steps 202–214, and the remaining steps represent branches within this loop. Beginning with step 202, the microcontroller 148 checks for a pulse or transition in the tachometer signal. If no pulse or transition is detected, then in step 204, the microcontroller 148 checks for a pulse or transition in the speedometer signal. If no pulse or transition is detected, then in step 206 the microcontroller 148 checks to determine if a clock interrupt has occurred. In one implementation, a clock interrupt occurs once a second. If no clock interrupt has occurred, then in step 208, the microcontroller 148 checks to determine if the clock has rolled over to a new minute. If no rollover has occurred, in step 210 the microcontroller 148 checks for an incoming command from the infrared port. If no command is detected, then in step 212 the microcontroller 148 checks to determine if the sleep timer has expired. If the timer hasn't expired, in step 214 the microcontroller resets the watchdog timer and returns to step 202.

Microcontroller 148 spends most of its time performing steps 202–214, repeating the tests and resetting the watchdog timer until one of the conditions changes. The watchdog timer is a hardware mechanism that resets and restarts the microcontroller 148 if too much time elapses since the last time the watchdog timer was reset. This mechanism provides protection against software "lock-ups" which cause the microcontroller to cease operating effectively. The various loop conditions are now discussed along with the actions taken by the microcontroller 148 when a condition change is detected.

The sleep timer checked in step 212 is preferably a timer that expires ten minutes after the last tachometer pulse is detected or the last command is received. If in step 212 the microcontroller 148 determines that the sleep timer has expired, then in step 216 it places the vehicle control unit 122 in sleep mode. As part of placing the system in sleep mode, the microcontroller 148 asserts a sleep signal to the power supply. The microcontroller 148 can also rouse the system from sleep mode by de-asserting the sleep signal. An incoming command or detection of a tachometer pulse may serve as triggers for returning the vehicle control unit to full power.

If an incoming command is detected in step 210, then in step 218, the microcontroller 148 processes the command and responds accordingly. Examples of suitable commands include "transmit log info", "transmit status info", "set speed limit to 15", "set rpm limit to 3500", and "set acceleration limit to 5".

If a tachometer pulse is detected in step 202, then in step 220 the microcontroller calculates the time period since the last pulse, a figure which is inversely proportional to the engine speed. To determine a more accurate figure, the microcontroller 148 may perform some averaging, filtering, or statistical screening to eliminate or reduce the effect of improbable figures. Next in step 222, the microcontroller 148 compares the calculated figure with a stored figure which represents the highest RPM detected so far, and stores whichever of the two represents the higher RPM. Then in step 224, the microcontroller 148 checks a KILLCOUNT variable to determine if the detected tachometer pulse should be suppressed. If the KILLCOUNT is greater than zero, in step 226 the microcontroller 148 suppresses the tachometer pulse and decrements the KILLCOUNT, and proceeds to step 214. Otherwise, the microcontroller compares the calculated figure to the programmed engine speed limit in step 228. If the limit has not been exceeded, the microcontroller proceeds to step 214. Otherwise, the microcontroller sets the KILLCOUNT to a positive value in step 230 before proceeding to step 214. The KILLCOUNT value may be a single predetermined constant, but is preferably a function of the amount by which the limit has been exceeded. The greater the excursion above the limit, the larger the KILLCOUNT setting. This translates into a greater reduction in engine power.

If a speedometer pulse is detected in step 204, then in step 232 the microcontroller calculates the time period since the last speedometer pulse, a figure which is inversely proportional to the vehicle's ground speed. To determine a more accurate figure, the microcontroller 148 may perform some averaging, filtering, or statistical screening to eliminate or reduce the effect of improbable figures. Next in step 234, the microcontroller 148 compares the calculated figure with a stored figure which represents the highest speed detected so far, and stores whichever of the two represents the higher speed. Then in step 236, the microcontroller compares the calculated figure to the programmed ground speed limit. If the limit has not been exceeded, the microcontroller proceeds to step 214. Otherwise, the microcontroller sets the KILLCOUNT to a positive value in step 238 before proceeding to step 214. As before, the KILLCOUNT value may be a single predetermined constant, but is preferably a function of the amount by which the limit has been exceeded. The greater the excursion above the limit, the larger the KILLCOUNT setting.

If a clock interrupt is detected in step 206, then in step 240 the microcontroller 240 measures an accelerative shock value in step 240. In step 242 the microcontroller 240 compares the measured value to a stored value representing the highest shock measured so far, and stores the greater of the two. The microcontroller then returns to step 214.

If a clock rollover is detected in step 208, then in step 246 the microcontroller compares the stored highest RPM figure to the engine speed limit. If the limit has not been exceeded the microcontroller proceeds to step 250. Otherwise, the microcontroller logs an RPM fault in step 248 before proceeding to step 250. The log entry preferably includes the time, the fault type (RPM), and the stored highest RPM figure. After being logged, the stored highest RPM figure is reset.

In step 250, the microcontroller compares the stored highest speed figure to the ground speed limit. If the limit has not been exceeded, the microcontroller proceeds to step 254. Otherwise, the microcontroller logs a speed fault in step 252 before proceeding to step 254. The log entry preferably includes the time, fault type (speed), and the stored highest speed figure. After being logged, the stored highest speed figure is reset.

In step 254, the microcontroller compares the stored highest shock value to the acceleration limit. If the limit has not been exceeded, the microcontroller returns to step 214. Otherwise, the microcontroller logs a shock fault in step 256 before returning to step 214. The log entry preferably includes the time, fault type (shock), and the stored highest shock value. After being logged, the stored highest shock value is reset.

In a preferred embodiment, the comparisons in steps 246, 250 are to determine if the limits have been exceeded by respective predetermined values. In this embodiment, a fault is logged only if the limits have been exceeded by a significant margin. Exemplary margins are 10 MPH for ground speed and 200 RPM for engine speed.

In an alternate embodiment, the microcontroller 148 can adjust the engine and ground speed limits based on the measured acceleration values. Since the acceleration values are related to the roughness of the terrain, this embodiment may advantageously provide a reduced ground speed limit in rougher terrain or an increased speed limit for on-road driving. As an example, a series of three or more 4 g (or higher) shocks about a second apart may be indicative of very rocky terrain. Upon detecting such a pattern, the microcontroller 148 may be programmed to gradually reduce the maximum vehicle speed limit to 5 mph until no shocks in excess of 2 g are detected for more than 5 seconds, at which time the maximum vehicle speed limit may be restored to the default programmed value.

In a preferred embodiment, the fault logs compiled by microcontroller 148 comprise a list of records having a time field, a fault-type field, and a fault value field. Such information allows for the evaluation of the correct operation of the vehicle control unit (for example if the fault values are within the programmed limits, or far outside the limits, then the faults may be due to a faulty sensor), and may additionally be used to determine appropriate programmed limits for a given wilderness region. In an alternate embodiment, the fault logs may be replaced with a fault counter that simply records the number of faults. An associated register may be used to record the time at which the counter was most recently reset.

A safety limiter for off-road and other powered vehicles has been disclosed. This limiter is more versatile than a simple governor which only limits engine speed. A large number of the ATV accidents in the field are directly attributable to excessive ground speed, which causes the operator to lose control or to be unable to avoid obstacles. Advantageously, the present invention limits the ground speed of the vehicle to a safe value without diminishing the vehicle's power when in the lower gears. Thus, the invention has the potential to sharply reduce the number of accidents, and result in a consequent reduction in insurance, maintenance, and repair costs.

The disclosed safety limiter protects in three ways: the engine speed is limited to prevent overrunning of the engine, the ground speed is limited to a safe value, and all excursions beyond predetermined operating limits are logged, so that appropriate disciplinary or corrective action can be taken. At the end of each shift, the crew management can download the log information from each vehicle, and thereby identify those vehicles which have an excessive number of faults and that consequently are being handled by irresponsible operators. Crew management can use the logs to identify these irresponsible operators and prohibit them from operating the vehicles.

The above discussion is meant to be illustrative of the principles of the present invention. However, numerous variations and modifications will become apparent to those skilled in the art once the above disclosure is fully appreciated. It is intended that the following claims be interpreted to embrace all such variations and modifications.

What is claimed is:

1. A vehicle which comprises:

an engine configured to convert fuel into power for a drive mechanism, wherein the engine includes an electronic ignition system;

a tachometer sensor coupled to the engine and configured to generate a tachometer signal which comprises a pulse sequence;

a speedometer sensor coupled to the drive mechanism and configured to generate a speedometer signal which indicates a ground speed; and a vehicle control unit configured to receive the tachometer signal and the speedometer signal, and coupled to the electronic ignition system to provide a modified tachometer signal which comprises a modified pulse sequence, wherein the modified pulse sequence is derived by selectively passing and suppressing pulses from the pulse sequence, and wherein the vehicle control unit suppresses pulses when the ground speed exceeds a predetermined ground speed value, wherein the vehicle control unit includes a memory for logging faults, and wherein the vehicle control unit logs a ground speed fault when the ground speed exceeds the predetermined ground speed value by a predetermined margin, and wherein the control unit further includes a shock sensor configured to detect excessive accelerative forces, and wherein the vehicle control unit logs a shock fault when the accelerative force exceeds a predetermined force value.

2. The vehicle of claim 1, wherein the vehicle control unit also logs a engine speed fault when an engine speed exceeds a predetermined engine speed value.

3. The vehicle of claim 1, wherein the vehicle control unit includes a communications port coupled to the memory, and wherein the vehicle control unit is configured to transmit the faults logged in the memory upon request.

4. The vehicle of claim 3, wherein the communications port is an infrared communications port.

5. A vehicle control unit which comprises:

a microcontroller configured to receive a speedometer signal indicative of a ground speed, configured to receive a tachometer signal which comprises a pulse sequence, and configured to responsively provide a suppression signal;

an output signal unit configured to receive the tachometer signal and the suppression signal, and configured to provide a modified tachometer signal by passing pulses from the tachometer signal when the suppression signal is de-asserted, and by suppressing pulses from the tachometer signal when the suppression signal is asserted, wherein the microcontroller is configured to assert the suppression signal for a selected number of consecutive pulses when the ground speed exceeds a predetermined ground speed value;

a nonvolatile memory coupled to the microcontroller and configured to store log information, wherein the log information includes fault records, wherein each fault record includes a time of occurrence, a fault type, and a fault value;

a communications port coupled to the microcontroller, wherein the microcontroller is configured to respond to commands received via the communications port, and wherein at least one such command response includes transmitting the log information via the communications port; and an accelerometer coupled to the microcontroller, and configured to detect peak accelerations experienced by the vehicle control unit.

6. The vehicle control unit of claim 5, wherein the communications port is an infrared communications port.

7. The vehicle control unit of claim 5, wherein the microcontroller is configured to store a ground speed fault record if the ground speed exceeds the predetermined ground speed value by a predetermined margin.

8. The vehicle control unit of claim 7, wherein the microcontroller is configured to store an engine speed fault record if the tachometer signal indicates an engine speed that exceeds a predetermined engine speed value by a predetermined engine speed margin.

9. The vehicle control unit of claim 5, wherein the microcontroller is configured to store an acceleration fault if the peak acceleration exceeds a predetermined acceleration value.

10. A method for increasing vehicle safety, wherein the method comprises:

receiving a tachometer signal which comprises a pulse sequence;

receiving a speedometer signal which indicates a ground speed;

deriving a modified tachometer signal by selectively passing and suppressing pulses from the tachometer signal, wherein the deriving includes:

determining if the ground speed exceeds a predetermined ground speed value;

when the ground speed exceeds the predetermined ground speed value, suppressing a selected number of pulses;

providing the modified tachometer signal to an electronic ignition system; and compiling a fault record during vehicle operation, wherein the compiling includes:

for predetermined time intervals during vehicle operation:

storing a ground speed fault record if the ground speed has exceeded the predetermined ground speed value by a predetermined margin within the previous time interval;

storing an engine speed fault record if the engine speed has exceeded a predetermined engine speed value by a predetermined engine speed margin within the previous time interval;

measuring a peak acceleration for the previous interval; and storing an acceleration fault record if the peak acceleration exceeds a predetermined acceleration value.

11. A method for increasing vehicle safety, wherein the method comprises:

receiving a tachometer signal which comprises a pulse sequence;

receiving a speedometer signal which indicates a ground speed;

deriving a modified tachometer signal by selectively passing and suppressing pulses from the tachometer signal, wherein the deriving includes:

determining if the ground speed exceeds a predetermined value;

when the ground speed exceeds the predetermined value, suppressing a selected number of pulses;

providing the modified tachometer signal to an electronic ignition system;

compiling a fault record during vehicle operation, wherein the compiling includes:

for predetermined time intervals during vehicle operation, storing a ground speed fault record if the ground speed has exceeded the predetermined value by a predetermined margin within the previous time interval;

determining if the fault record indicates reckless vehicle operation; and indicating which vehicle operators should be prohibited from operating vehicles.

12. A computer readable storage medium in which software is stored for performing the method recited in claim.

* * * * *

UNITED STATES PATENT AND TRADEMARK OFFICE

CERTIFICATE OF CORRECTION

PATENT NO. : 6,253,143 B1
DATED : June 26, 2001
INVENTOR(S) : Darin Silvernagle et al.

It is certified that error appears in the above-identified patent and that said Letters Patent is hereby corrected as shown below:

Column 9,
Line 30, change claim 2 to read as follows:

-- The vehicle of claim 1, wherein the vehicle control unit also logs a engine speed fault when an engine speed exceeds a predetermined engine speed value. --

Column 12,
Line 7, change claim 12 to read as follows:

-- A computer readable storage medium in which software is stored for performing the method recited in claim 11. --

Signed and Sealed this

Eighth Day of April, 2003

JAMES E. ROGAN
*Director of the United States Patent and Trademark Office*